United States Patent [19]

Dallen

[11] 3,874,142

[45] Apr. 1, 1975

[54] REGLET JOINT

[75] Inventor: John A. Dallen, Port Clinton, Ohio

[73] Assignee: The Standard Products Company, Cleveland, Ohio

[22] Filed: Mar. 5, 1973

[21] Appl. No.: 338,389

Related U.S. Application Data

[63] Continuation-in-part of Ser. No. 136,848, April 23, 1971, abandoned.

[52] U.S. Cl.............................. 52/656, 52/400, 52/476
[51] Int. Cl............................... E04c 2/38, E04f 1/56
[58] Field of Search........................... 52/656–658, 52/475, 476, 397–400, 758 H, 732; 403/292, 295, 401, 402; 49/405

[56] References Cited
UNITED STATES PATENTS

| | | | |
|---|---|---|---|
| 684,304 | 10/1901 | Pfleging | 52/758 H |
| 2,504,700 | 4/1950 | Krantz | 52/758 H |
| 2,717,667 | 9/1955 | Bancroft | 403/295 |
| 2,976,970 | 3/1961 | Toney | 52/732 |
| 3,319,985 | 5/1967 | Arnett | 52/656 |
| 3,426,482 | 2/1969 | Mock | 52/656 |
| 3,512,318 | 5/1970 | Turner | 52/397 |
| 3,534,490 | 10/1970 | Herbert | 403/401 |
| 3,546,842 | 12/1970 | Blum | 52/656 |
| 3,603,627 | 9/1971 | Kaffel | 52/656 |
| 3,709,533 | 1/1973 | Walters | 52/656 |

FOREIGN PATENTS OR APPLICATIONS

| | | | |
|---|---|---|---|
| 349,875 | 6/1931 | United Kingdom | 403/401 |
| 889,069 | 12/1971 | Canada | 52/400 |

Primary Examiner—Ernest R. Purser
Assistant Examiner—James L. Ridgill, Jr.
Attorney, Agent, or Firm—Meyer, Tilberry & Body

[57] ABSTRACT

A joint is formed between adjacent end portions of a pair of reglets. The reglets include a substantially channel-shaped cross-sectional configuration defined by spaced-apart sidewalls and a bottom wall. The sidewalls have flanges extending outwardly therefrom. The flanges include bottom surfaces having spline receiving recesses therein. Elongated splines are received in the spline receiving recesses for holding adjacent end portions of the reglets together with the flanges substantially aligned.

6 Claims, 12 Drawing Figures

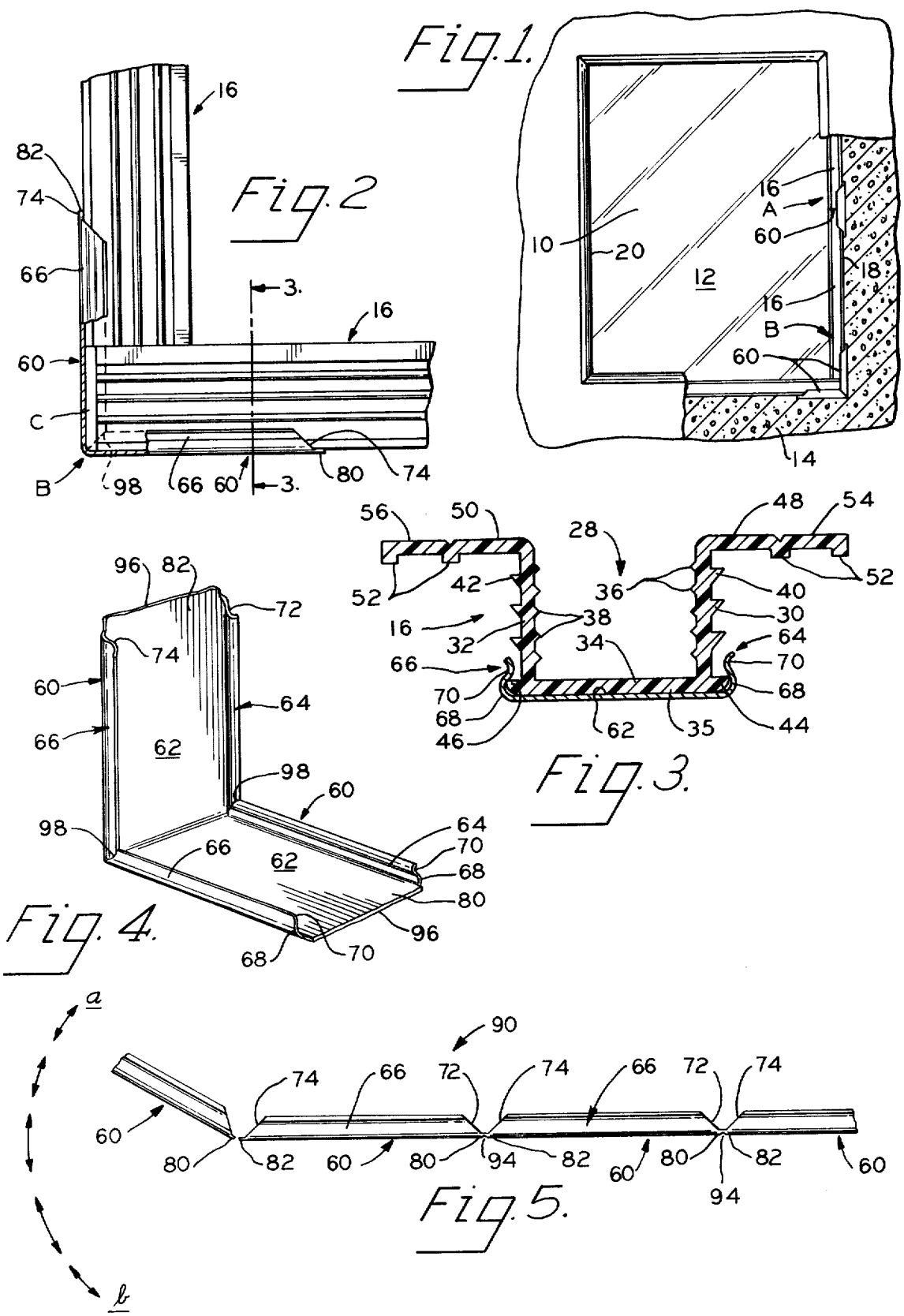

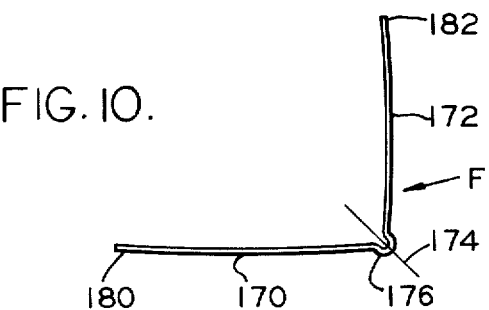
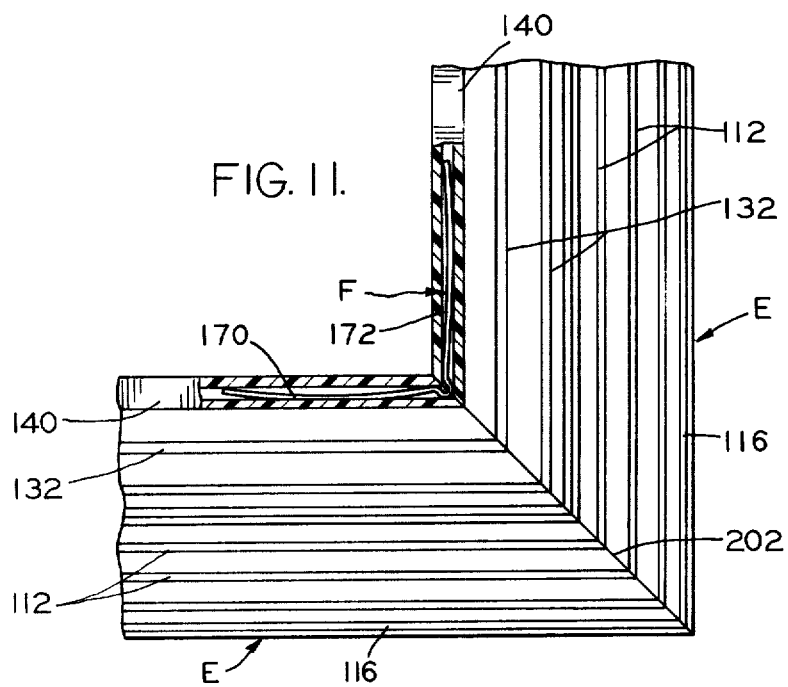
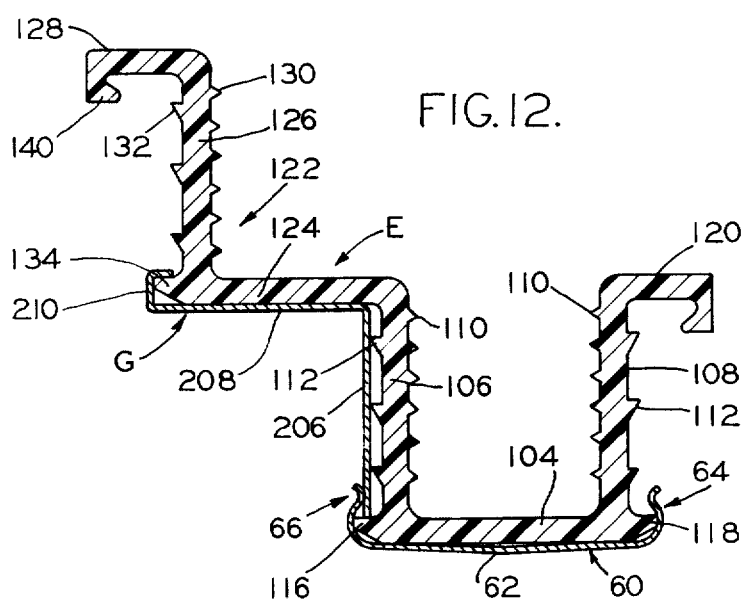

REGLET JOINT

BACKGROUND OF THE INVENTION

This application is a continuation-in-part of U.S. Pat. application Ser. No. 136,848 filed Apr. 23, 1971, now abandoned.

This application pertains to the art of joints, and more particularly to joints between adjacent end portions of reglets used in panel sealing systems. Although the invention is particularly applicable to use with joining reglets of panel sealing systems and will be described with particular reference thereto, it will be appreciated that the invention has broader applications and many be used for joining other devices.

The present invention is particularly applicable to window sealing systems for use with concrete walls wherein reglets are generally cast into the walls around a window opening wherein the reglets define the means for mounting a window panel and will be described with particular reference thereto; however, it will be appreciated that the invention has broader applications such as wherever it may be desirous of joining adjacent reglets in a predetermined desired relationship relative to each other for mounting any type of construction components.

Reglets are elongated channel shaped members of extruded plastic which form the means for holding a windowpane in the window opening of a concrete wall. Usually they are placed in their ultimate position and the concrete is then cast around the outer sides of the channel. To insure that the reglet is firmly attached to the wall, the outside of the channel usually is provided with laterally extending flanges.

Heretofore, when reglets were imbedded in concrete walls or the like, there have been no means provided to interconnect adjacent reglets. This made it difficult to maintain the adjacent reglets in the desired aligned relationship in order to form a desired window panel mounting gasket receiving channel. This problem was particularly acute when the concrete walls were poured around the reglets in that the force of pouring often caused the reglets to become misaligned relative to the other reglets comprising the retaining frame. As a result, it was necessary to utilize a single or continuous reglet for each side of the retaining frame to be formed. This practice, of course, developed a substantial number of "scrap" reglet segments in that once a reglet length was cut to size, that portion remaining could not be used unless it was long enough to form a complete retaining frame side elsewhere. Obviously, a substantial amount of scrap was inherent with this type of use.

Further, when preparing a multi-sided frame, for example, a rectangular frame for a corresponding rectangular opening, it was necessary to miter or bevel the ends of the adjacent corner forming reglets in order that they could be closely fitted together in a desired spaced relationship. This mitering step necessitated rather precise angled cuts to be made which, required substantial time and skill to perform. As these corner reglets were not rigidly affixed to each other, the pouring and vibrating of the concrete around them often caused misalignment as described above. These mitered corners were also necessary to prevent the concrete or other construction material from entering the ends of and fouling the reglet channel areas.

SUMMARY OF THE INVENTION

In accordance with the present invention, a joint is formed between adjacent end portions of reglets. The reglets are of the type including a substantially channel-shaped cross-sectional configuration defined by spaced-apart sidewalls and a bottom wall. The sidewalls have flanges extending outwardly therefrom and include bottom surfaces having spline receiving recesses therein. Elongated splines are received in the spline receiving recesses for holding adjacent end portions of the reglets together with the flanges substantially aligned.

In accordance with one arrangement, the splines are arcuately longitudinally curved on opposite sides of their midpoint to insure a good frictional engagement with the spline receiving recesses. In addition, the splines are preferably flat metal members having rounded opposite ends for ease of insertion of the splines within the spline receiving recesses.

In accordance with another aspect of the present invention, the spline joint may be used for joining adjacent end portions of reglets in substantially straight-line continuation of one another, or in substantially perpendicular arrangement to one another.

The improved spline joining arrangement of the present application may be used alone or in combination with the clip member and clip joint described in the aforementioned application Ser. No. 136,848.

The principal object of the present invention is the provision of a reglet joint which may be used to rigidly affix adjacent reglets to each other in a predetermined desired aligned relationship.

Another object of the present invention is the provision of a reglet joint which eliminates the necessity for mitering or beveling the ends of those reglets forming frame corners.

Another object of the present invention is the provision of a reglet joint which permits the use of short or odd lengths of reglets in forming a side of a panel retaining frame.

Still another object of the present invention is the provision of a new reglet joint which prevents concrete or other building materials comprising a building wall from entering the reglet channel areas at the corner joints of a panel retaining frame.

BRIEF DESCRIPTION OF THE DRAWING

The invention may take physical form in certain parts and arrangements of parts, a preferred embodiment of which will be described in detail in the specification and illustrated in the accompanying drawings which form a part hereof and wherein:

FIG. 1 is a plan view, with portions of the wall broken away, of a window mounted in a concrete wall illustrating a preferred embodiment of the invention;

FIG. 2 shows two mounting clips in accordance with the subject invention as they are used in rigidly connecting two reglet members forming a corner for the frame shown in FIG. 1;

FIG. 3 is a cross-sectional view taken along line 3—3 in FIG. 2;

FIG. 4 is a perspective view of the two reglet joining clips used in FIG. 2;

FIG. 5 shows a portion of a strand of the reglet joining clips of the subject invention with one of the reglet clips being broken away therefrom;

FIG. 10 is an elevational view of a spline member of FIGS. 7 and 8 after it has been deformed for use in a substantially perpendicular joint;

FIG. 11 is a plan view of a substantially right-angle joint; and

FIG. 12 is a cross-sectional elevational view showing a reglet member having an alignment clip secured thereto.

DESCRIPTION OF A PREFERRED EMBODIMENT

Figure 6:
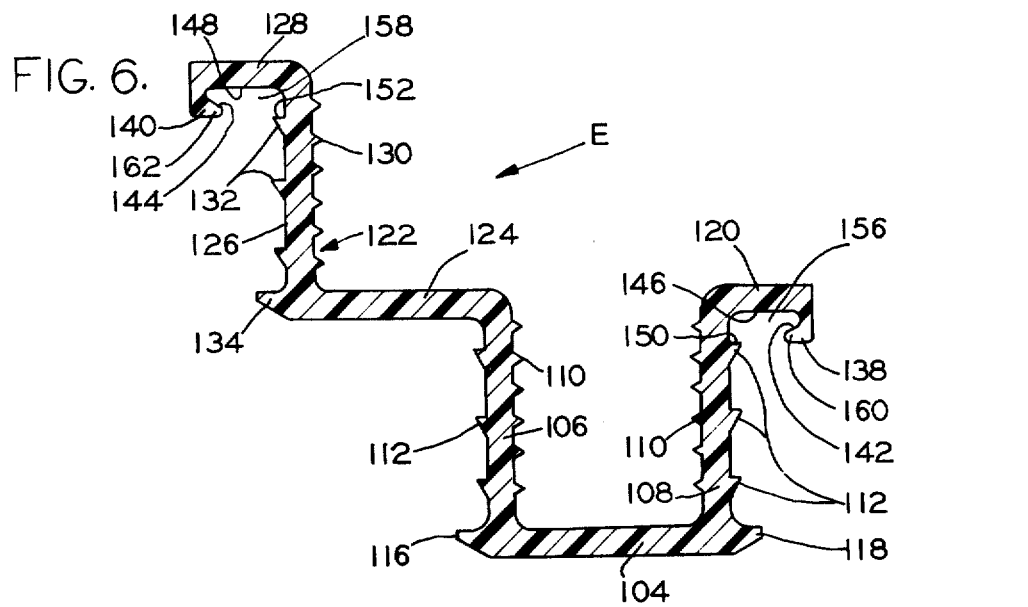
FIG. 6 is a cross-sectional elevational view of a reglet with which the joint of the present invention is used.

Referring now to the drawings, wherein the showings are for the purposes of illustrating a preferred embodiment of the invention only and not for purposes of limiting same, the FIGURES shows a panel 10 mounted in an opening 12 in a concrete wall 14. Panel 10 could comprise any type of construction panel, however, in the preferred embodiment, this panel is a glass windowpane. Similarly, wall 14 could be formed from other construction materials. Disposed about opening 12 in concrete wall 14 are a plurality of reglets 16, portions of which are more precisely shown in FIGS. 2 and 3. This type of panel mounting system is known in the art as may be seen more completely in my copending and commonly assigned continuation-in-part application Ser. No. 89,954 and the commonly assigned U.S. Pat. No. 3,524,290. These reglets are received in gasket receiving channels 18, integrally formed in concrete wall 14 when the wall is poured around the prepositioned reglets, which face inwardly towards opening 12. An elastomeric gasket member 20 has a tongue (not shown) which is received in the reglets and includes means for retaining panel 10 in a desired position relative to opening 12. Again, this type of arrangement is known in the art and is shown in the above mentioned commonly assigned application and patent.

More specifically, in this type of sealing system, reglets 16 each include a channel area 28 comprised of a pair of spaced apart sidewalls 30, 32 joined together by a bottom wall 34. The bottom wall has a generally flat outer surface area 35. Disposed on the inside of sidewalls 30, 32, and extending longitudinally therewith, are a plurality of inwardly extending protrusions 36, 38 respectively. Similarly disposed on the outside surfaces of the sidewalls are a plurality of outwardly extending protursions 40, 42. It is to be noted that protrusions 36, 38 matingly engage a tongue member (not shown) on gasket 20 as is known in order to maintain the gasket in a desired panel sealing relationship with panel 10. Similarly, protrusions 42, 44 engage the sides of reglet receiving channel 18 in concrete wall 14. As reglets 16 are generally placed in position prior to pouring the concrete wall, the reglets are permanently retained in receiving channels 18 by these outwardly extending protrusions; however, other methods of locating the reglets relative to the wall may be used without affecting the operation or scope of the reglet joining clip of the subject application. Disposed coextensive with bottom wall 34 are outwardly extending bottom wall extensions or wings 44, 46 which also serve to retain the reglets in their respective receiving channels 18, but which also are used with the subject clip as will be hereinafter described.

Each reglet 16 also includes shoulder areas 48, 50 including downwardly extending longitudinal retaining protrusions 52. Some reglets may also include break-off tabs 54, 46 which increase the shoulder width of the reglets but which may be easily removed if a thin shoulder area is preferred due to construction requirements. Other shoulder configurations have also been heretofore utilized, it only being necessary for purposes of the subject invention that reglets include a channel areas as hereinabove described.

The joining clip of the subject invention is best shown in detail in FIGS. 3 and 4 and specific reference will be made thereto. The joining clip itself is generally designated 60 and includes a base or bottom 62 and upwardly extending legs 64, 66. In the preferred embodiment, these clips are stamped and formed from a thin, relatively rigid metal. It will be understood, however, that other materials, such as plastic, could be utilized. In the preferred embodiment, base 62 is dimensioned to be received in a closely embracing relationship with outer surface area 35 of bottom wall 34. In the preferred embodiment, legs 64, 66 each comprise a longitudinal outwardly extending curvilinear surface 68 adjoining the side edges of base 62 and a longitudinal inwardly extending curvilinear surface 70 adjoining surface 68. As can best be seen in FIGS. 4 and 5, legs 64, 66, i.e., surfaces 68, 70, extend substantially over the length of base 62. However, it will be noted that legs 64, 66 each include tapered ends 72, 74 which converge upwardly from the base. The taper on each end may be of any angle, however, in the preferred embodiment, an angle of no greater than 45° measured relative to base 62 is preferred as will hereinafter become apparent relative to the use of the clip.

Each clip includes identical joining areas 80, 82 (FIG. 5) at the ends thereof which areas are bendable through an angle of at least 90° without breaking but upon repeated bendings are frangible. Essentially, areas 80, 82 are merely extensions of base 62; however, in the preferred embodiment, it should be noted that the ends of areas 80, 82 are notched to a thickness less than the thickness of the base.

The joining clip of the subject invention is most advantageously formed in a strand generally designated 90 with other identical clips and are interconnected by joining areas 80, 82 in an end to end relationship. As the ends of the joining clips are notched to a thickness less than the thickness of the support area, a notch 94 is formed between each joining clip 60 and the adjacent joining clips at the associated joining areas 80, 82. Each notch 94 extends transversely across the strand.

Two uses of the subject reglet joining clip are shown in FIG. 1, namely, in joining together lengths of reglets in order to form a single elongated reglet and in forming a corner joint for the panel retaining frame. These uses are generally designated A, B, respectively in the FIGURES. In joining two adjacent lengths of reglets only one clip 60 is utilized. In order to remove this one clip from the strand shown in FIG. 5, it is merely necessary, due to notches 94, to repeatedly bend the clip arcuately back and forth about notch 94 as shown by directions *a* and *b* therein. The result of this bending is to establish metal working stress areas at the notch so that a fracture will occur across the notch following only a few bending cycles. As best seen in FIG. 4, this fracture establishes slightly uneven or jagged edges 96 on joining areas 80, 82; however, these uneven edges do not affect the operation or use of the clip. The fact that the clips may be broken away from the strand by this arcuate bending movement is important for job site use in that it eliminates the need for any metal cutting tools for the separation process. Alternatively, of course, a pair of tin snips could be used to make the separation.

Once this single clip has been removed from strand 90, it is ready for installation to secure the two adjacent reglets 16 together by merely snapping or sliding the clip in position on one end of a reglet as best shown in FIG. 3, such that approximately one half the length of base 62 closely embraces outer surface area 35 of that reglet. The clip may be "snapped on" the reglet by placing the clip in the desired position with curvilinear surfaces 70 of legs 64, 66 in longitudinal engagement with bottom wall extensions or wings 44, 46 and then exerting a pressure against base 62 so that surfaces 70 are biased outwardly from each other to permit the clip to pass into a tight fitting relationship with the reglet whereby base 62 closely embraces outer surface area 35. In this position, extensions or wings 44, 46 are received in outwardly extending curvilinear surfaces 68 of the legs. As the clip is formed from a resilient material, surfaces 70 spring back toward each other to lock the clip into place once the extensions or wings are received in the outwardly extending curvilinear surfaces. This same above described procedure is then repeated relative to the other reglet length in order to form the completed reglet.

In order to complete corner joint B, shown in FIGS. 1 and 2, two of the clips of the subject invention are required. It is therefore necessary to remove two interconnected clips from strand 90 as hereinabove described. Once removed and as best shown in FIGS. 2 and 4, these two clips are then bent at notch 94 so that they are generally normal to each other. In the preferred embodiment, the taper of ends 72, 74 is 45° when measured from their respective support areas. Therefore, when the two clips are bent the normal position with each other, these tapers come together at an abutting joint 98 to completely enclose the joint area and aids in preventing the concrete or other construction material from entering into the reglet channel areas. With particular reference to FIG. 2, the horizontally disposed reglet is then placed in position in its associated clip as has been hereinabove described. It should be noted that there is a small gap c between the end of this reglet and base 62 of the vertically extending clip. This distance should not exceed the total height of legs 64, 66, again, in order to prevent the concrete or other construction material from entering the reglet channel area during pouring. The vertically disposed reglet may then be inserted into the vertically extending clip with the reglet leading edge closely engaging the shoulders of the horizontally extending reglet member.

The length of each clip as measured longitudinally along base 62 need not be substantial. It is only necessary that it be sufficient to clampingly engage the adjoining reglets and provide some rigidity for the joint. It has been found that for reglets having a channel width of ¾ inch and a channel height of 1 inch, a clip length of 2 inches is entirely satisfactory.

Although the subject clip has only been shown for use in connecting two longitudinally abutting reglets and for use in forming a generally square corner joint, it will be appreciated by those skilled in the art that other combinations of the subject clip may be used to perform other clipping functions as required by the very nature of the reglet use requirements. For example, it would be possible to seal a panel which does not have square corners, in which case, the combination of two clips described in this specification and drawings would be bent to whatever degree dictated by the panel shape. Further, various numbers of the clips could be used in addition to the number described with reference to joints A and B in FIG. 1.

In the arrangement described, it will be recognized that leg 64 of clip member 60 has a generally S-shaped cross-sectional configuration, while leg 66 has a generally backward S-shaped cross-sectional configuration. Each leg curves outwardly as at 68 from base portion 62 and then curves inwardly as at 70 before merging into outwardly extending terminal end portions facing outwardly from sidewalls 30 and 32.

In the arrangement shown and described, outwardly extending flanges 48 and 50 sometimes become misaligned. This is particularly true in reglets having other shapes. In accordance with the present invention, an improved joining arrangement is provided for preventing misalignment of such flanges on reglet members.

Reglet member E of FIG. 6 includes a central portion having a generally U-shaped cross-sectional configuration including a base portion 104 and spaced-apart sidewalls 106 and 108 extending upwardly therefrom. The inner facing surfaces of sidewalls 106 and 108 have longitudinally extending and vertically spaced protrusion 110 thereon for engaging a tongue member on a resilient gasket in a known manner. Outwardly extending longitudinal protrusions 112 are provided on the outward surfaces of sidewalls 106 and 108 for anchoring reglet member E within concrete or the like. Base 104 includes outwardly extending projections or extensions 116 and 118 extending outwardly beyond sidewalls 106 and 108.

In accordance with one arrangement, sidewall 108 has an outwardly extending flange 120 extending outwardly from the upper end thereof. Sidewall 106 includes an outwardly extending flange 122 defined by a first substantially horizontal portion 124 extending outwardly from the upper end of sidewall 106; an upwardly extending flange sidewall portion 126; and an outwardly extending terminal flange 128 extending outwardly from the upper end of flange sidewall 126. Flange sidewall 126 includes longitudinally extending inner protrusions 130 and outwardly extending longitudinal protrusions 132 for the same purpose as the protrusions on sidewalls 106 and 108. Substantially horizontal portion 124 of sidewall 122 includes an outwardly extending extension 134.

In accordance with a preferred arrangement, outwardly extending flanges 120 and 128 each include a downwardly and inwardly extending projection 138 and 140. Projections 138 and 140 include downwardly inclined surfaces 142 and 144 which are spaced downwardly from the lower surfaces 146 and 148 of flanges 120 and 128. The uppermost one of projections 112 and 132 have upper surfaces 150 and 152 spaced downwardly respectively from lower surfaces 146 and 148 of flanges 120 and 128. The space between surface 146 and surfaces 142 and 150 defines a longitudinal spline receiving recess 156. The space between surface 148 and surfaces 144 and 152 defines a longitudinally extending spline receiving recess 158. Terminal inwardly extending portions 160 and 162 of projections 138 and 140 may be surrounded with concrete in maintaining flanges 120 and 128 in proper position.

Figure 7:
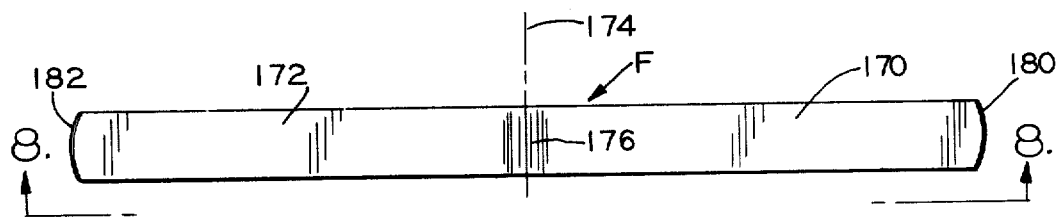
FIG. 7 is a plan view of a spline member used with the joint of the present invention.
Figure 8:
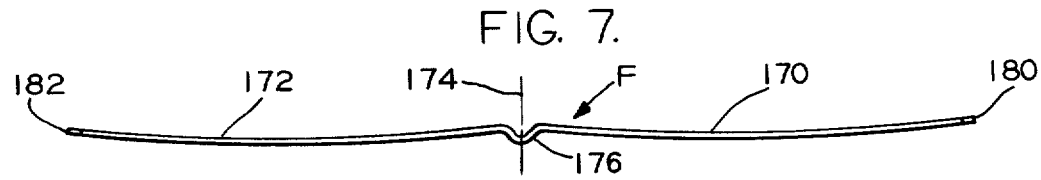
FIG. 8 is an elevational view looking generally in the direction of arrows 8—8 of FIG. 7.

Substantially flat and elongated metal spline member F in FIG. 7 has opposite portions 170 and 172 on opposite sides of centerline 174. Opposite end portions 170 and 172 are receivable within spline receiving recesses 156 and 158 on adjacent reglet members positioned in parallel abutting relationship or at right angles to one another. Obviously, the reglets can also be positioned at other angles relative to one another. In accordance with one arrangement, spline member F is stamped from cold rolled steel having a thickness of around 0.020 inch. Spline member F is curved as at 176 at centerline 174 so that its upper surface lies substantially on the periphery of a circle having a radius of 0.020 inch. Spline member F has opposite ends 180 and 182 which are transversely substantially smoothly curved. This aids in inserting spline members F within spline receiving recesses 156 and 158. In accordance with a preferred arrangement, opposite portions 170 and 172 of spline member F are downwardly curved in the same direction as curved portion 176. In one arrangement, opposite portions 170 and 172 are curved so that the distance between the lowermost point on their upper surfaces and the highest point on their upper surfaces is around 1/32 of an inch. This arrangement provides some spring action so that opposite portions 170 and 172 of spline F will tightly wedge within either of spline receiving recesses 156 or 158.

Figure 9:
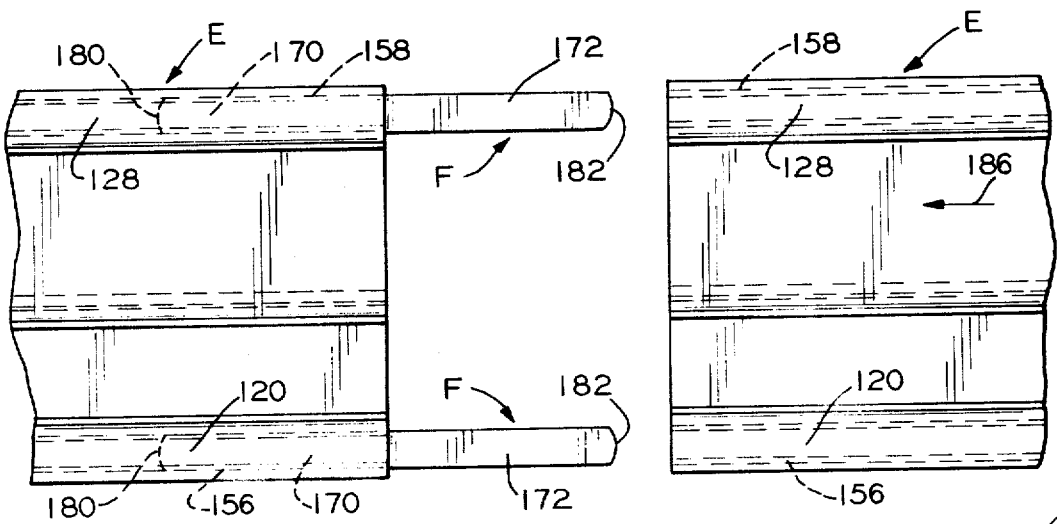
FIG. 9 is a plan view generally showing a joint between adjacent end portions of reglets.

FIG. 9 shows end portions 170 of splines F positioned within spline receiving recesses 156 and 158 of one reglet member E. An adjacent reglet member E positioned in parallel aligned relationship with the reglet member already having splines therein is movable in the direction of arrow 186 until spline end portions 172 are received in spline receiving recesses 156 and 158 on the second reglet member. This will maintain flanges 120 and 128 in alignment so they cannot separate from one another.

FIG. 10 shows a spline member F bent along centerline 174 and curved portion 176 so that opposite leg portions 170 and 172 extend substantially perpendicular to one another. Two reglet members E of FIG. 11 may then be cut as indicated by line 202 at 45° angles for abutting one another at a substantially right angle. The bent spline member of FIG. 10 is then positionable within spline receiving recesses 156 and 158 on the abutting end portions of the reglet members for securely holding the flanges against misalignment with reglet members E positioned perpendicular to one another.

FIG. 12 shows another arrangement wherein a substantially right angle clip member G has a first leg portion 206 positioned against the outer surface of sidewall 106 and a second leg 208 positioned against the undersurface of horizontal portion 124. Second leg 208 terminates in an upwardly and inwardly extending portion 210 which receives extension 134. Clip member 60 is then positioned over the base of the reglet member in the same manner as described with respect to FIGS. 1–4. Leg 66 firmly bears against the lower end portion of first leg 206 while portion 210 firmly grips extension 134. This firmly maintains entire flange 122 on adjacent reglets in alignment with one another. Clip member G is capable of being used on reglet members which are positioned in aligned abutting relationship or at right angles to one another. In the arrangement of FIG. 12, clip 60 is shown as having a base 62 which curves outwardly smoothly away from base 104 of reglet E. This arrangement provides clip member 60 with additional spring action so that legs 64 and 66 firmly grip protrusions 44 and 46.

In the arrangement shown and described, it will be recognized that clip members 60 and G are usable in combination with one another and with splines F for securely holding a pair of adjacent abutting reglets in aligned position. In addition, for a reglet member of the type shown in FIG. 3, it is possible to provide spline receiving recesses as described with respect to FIG. 6 for receiving splines F. Therefore, splines F and clips 60 are usable in combination with one another without clip G depending upon the shape of the reglet members.

In the arrangements described, it will be recognized that second flange 122 may be considered stepped so that it includes a first sidewall 106 adjacent bottom wall or base 104 of reglet E; a second sidewall portion 126 positioned outwardly and upwardly of first sidewall portion; a horizontal portion 124 integrally interconnecting first and second sidewall portions 106 and 126; and an outwardly extending flange portion 128. Member G may be considered a stiffening member having a groove firmly receiving extension 134.

It will be recognized that clip members 60 and G may be formed integral with one another as a one-piece clip member. In such an arrangement, first leg 206 would be integral with S-shaped leg portion 66 of clip member 60. That is, inwardly curved portion 70 of leg portion 66 would simply merge integrally into leg 206 of clip member G.

Although the invention has been shown and described with respect to certain preferred embodiments, it is obvious that equivalent alterations and modifications will occur to others skilled in the art upon the reading and understanding of this specification. The present invention includes all such equivalent alterations and modifications and is limited only by the scope of the claims.

Having thus described my invention, I claim:

1. A joint between adjacent end portions of a pair of reglets of the type including a substantially channel-shaped cross-sectional configuration defined by spaced-apart side walls and a bottom wall, said side walls having flanges extending outwardly therefrom, said flanges including bottom surfaces having longitudinally extending spline receiving recesses therein, said recesses having a width in the direction parallel to said flanges and having walls spaced-apart in the direction perpendicular to said flanges, and elongated metal splines received in said spline recesses for holding said adjacent end portions of said reglets together with said flanges substantially aligned, each of said splines having a longitudinal axis, a width corresponding to said recess width and a thickness dimension in said direction perpendicular to said flanges, said thickness dimension being substantially less than said width dimension and less than the spacing of said recess walls, and each of said splines having an intermediate portion bridging said adjacent end portions of said pair of reglets and leg portions extending from said intermediate portion and received in a corresponding spline recess, said intermediate portion extending across the spline transverse to said spline axis and being arcuate and offset in said direction perpendicular to said flanges, said intermediate portion further having ends transverse to said spline axis and engaging corresponding ones of said spaced recess walls of said pair of reglets and a portion between said ends and spaced from said corresponding ones of said recess walls and engaging the other of said recess walls of said pair of reglets, each of said leg portions of said spline extending into the corresponding spline recess from the corresponding end of said intermediate portion and having a terminal end edge spaced from said corresponding end and engaging said one of said spaced recess walls of the corresponding spline recess, and each of said leg portions of said spline having a longitudinally arcuate curvature in said direction perpendicular to said flanges, said curvature being from said corresponding end of said intermediate portion to said terminal end edge, said curvature providing for said leg portion to be offset in said direction perpendicular to said flanges a distance greater than the spacing of said recess walls, whereby a portion of each of said leg portions between said corresponding end of said intermediate portion and said terminal end edge engages the corresponding one of said other of said recess walls.

2. The joint of claim 1 wherein said flanges include outer ends having projection means extending downwardly and inwardly therefrom, each of said sidewalls having projection means extending outwardly therefrom below said bottom surfaces of said flanges, said spline receiving recesses being defined between said projection means and said bottom surfaces of said flanges.

3. The joint of claim 1 wherein said reglets extend substantially perpendicular to one another and said leg portions of said splines are at substantially right angles to one another.

4. A joint between adjacent end portions of a pair of reglets of the type including a substantially channel-shaped cross-sectional configuration defined by spaced apart side walls and a bottom wall, said side walls having flanges extending outwardly therefrom, said flanges including bottom surfaces having spline receiving recesses therein, and elongated splines received in said spline recesses for holding said adjacent end portions of said reglets together with said flanges substantially aligned, said side walls and bottom wall of each reglet having outer surfaces intersecting to define laterally spaced longitudinally extending edges, laterally outwardly extending projections on said edges and a clip member including a portion longitudinally spanning said outer surfaces of said bottom walls of said adjacent end portions of said reglets, said clip member including leg members extending upwardly from said spanning portion and having inwardly open recesses receiving said projections, said projections being resiliently engaged laterally between said leg portions.

5. The joint of claim 4 wherein at least one of said side walls on each of said reglets is stepped to include a first side wall portion adjacent said bottom wall and a second side wall portion positioned outwardly and upwardly of said first side wall portion, said first and second side wall portions being integrally connected by a horizontal portion, a stiffening member positioned against the outer surfaces of said first side wall portion and said horizontal portion, said stiffening member including an end portion positioned between the outer surface of said first side wall portion and one of said leg members on said clip.

6. The joint of claim 5 and including an outwardly extending projection adjacent the intersection of the outer surfaces of said second side wall portion and said horizontal portion, said stiffening member including an inwardly open groove receiving said projection.

* * * * *